United States Patent Office 3,591,664
Patented July 6, 1971

3,591,664
PROCESS FOR THE PREPARATION OF TRI-SUB-
STITUTED HYDROCARBYL PHOSPHATES
Yutaka Kodama and Tsutomu Kodama, Toyama-shi, and
Masao Nakabayashi, Namerikawa-shi, Japan, assignors
to Toyama Chemical Co., Ltd., Tokyo, Japan
No Drawing. Filed Sept. 11, 1968, Ser. No. 759,241
Int. Cl. C07f 9/08
U.S. Cl. 260—973                                              2 Claims

ABSTRACT OF THE DISCLOSURE

Preparation of tri-substituted hydrocarbyl phosphates, by reacting dihydrocarbylchlorophosphates with alcohols in the presence of caustic alkalis, such as caustic soda and caustic potash, etc., whereby the hydrogen chloride formed simultaneously is neutralized quickly with the caustic alkali. According to this process, it is possible not only to prevent the decomposition of dihydrocarbylchlorophosphates but also to suppress the side reaction represented by the equation:

$$(RO)_3PO + HCl \rightarrow (RO)_2P(O)OH + RCl$$

wherein R is an alkyl group. The compounds produced by the invention are useful as additives for gasoline, plasticizers for thermoplastic resins and flame retarding agents for rigid polyurethane foam, polyester resin, etc.

---

The present invention relates to a novel industrial process for the preparation of tri-substituted hydrocarbyl phosphates.

Many processes have been reported heretofore for preparing trialkylphosphates industrially, which comprise reacting phosphorus oxychlorides directly with alcohols. However, these processes result in very low yields, presumably because of the side reaction represented by the Equation A below wherein the hydrogen chloride formed the reaction reacts with the product triphosphates.

$$(RO)_3PO + HCl \rightarrow (RO)_2P(O)OH + RCl \quad (A)$$

wherein R is an alkyl group.

It is therefore necessary to remove the hydrogen chloride produced from the reaction mixture. For removing the hydrogen chloride, there have been proposed methods wherein the hydrogen chloride is neutralized with inorganic bases, such as sodium carbonate (U.S. Pat. No. 2,008,478) and ammonia, or with organic amines, such as pyridine, dimethylaniline and trimethylamine, but each of these methods results in a low yield of the end product. This is probably because in practicing these methods a side reaction takes place wherein ammonia and amines react directly with phosphorus oxychlorides, and the yields of the triphosphates are thereby lowered. When sodium carbonate is used, since it is slightly-soluble in the reaction mixture, the neutralization of the hydrogen chloride formed during the reaction does not proceed smoothly, so that hydrogen chloride tends always to coexist in the reaction mixture, and as a result, the yields of triphosphate are lowered. Further, these methods have the disadvantage that since hydrogen chloride is produced in an amount of 3 mols per 1 mol of phosphorus oxychloride, the hydrogen-chloride removing agent must be used in an amount equivalent to the amount of hydrogen chloride.

The present inventors conducted a study on the process for preparing tri-substituted hydrocarbyl phosphates, wherein dihydrocarbylchlorophosphates which can be prepared substantially quantitatively by chlorinating dihydrocarbyl phosphites which can be obtained theoretically by reaction between corresponding alcohols and phosphorus trichloride without using neutralizing agent are used as the starting material and reacted with an alcohol. In this process, it has only been known to react sodium alcoholate with a dihydrocarbylchlorophosphate $$[(RO)_2P(O)Cl + R'ONa \rightarrow (RO)_2P(O)OR' + NaCl]$$

since the dihydrocarbylchlorophosphates are very easily hydrolyzed by water or caustic alkalis, but such a process has not been put into effect because the material cost is high due to the use of metallic sodium. Under the circumstances, the present inventors have reviewed the conditions which enable inexpensive caustic alkalis to be used as a neutralizing agent in lieu of sodium alcoholate in the reaction between the dihydrocarbylchlorophosphates and alcohols, and found that the desired compounds can be obtained in very high yields as represented by Equation D without encountering the decomposition of dihydrocarbylchlorophosphates, in spite of the fact that water is produced.

According to the present invention, there is provided a process for the preparation of tri-substituted hydrocarbyl phosphates, which comprises reacting a dihydrocarbylchlorophosphate with an alcohol in the presence of a caustic alkali, such as caustic soda or caustic potash, etc., whereby the hydrogen chloride formed simultaneously is neutralized quickly with the caustic alkali. According to this process, it is possible not only to prevent the decomposition of dihydrocarbylchlorophosphates but also to suppress the side reaction represented by Equation A which has been encountered heretofore, and consequently the product compounds can be easily prepared industrially in high yields.

The process of the present invention is represented by the following equations:

$$3ROH + PCl_3 \rightarrow (RO)_2POH + RCl + 2HCl \quad (B)$$

$$(RO)_2POH + Cl_2 \rightarrow (RO)_2P(O)Cl + HCl \quad (C)$$

and when R is an aryl group, the dihydrochlorocarbylchlorophosphates are produced from phosphorus oxychloride and alcohol as shown by Equation C' below:

$$2ROH + POCl_3 \rightarrow (RO)_2P(O)Cl + 2HCl \quad (C')$$

$$(RO)_2P(O)Cl + R'OH + MOH \rightarrow$$
$$(RO)_2P(O)(OR') + MCl + H_2O \quad (D)$$

wherein R is selected from the group consisting of alkyls, alkenyls, and aryls having 1 to 8 carbon atoms and said groups substituted by halogen, R' is selected from the group consisting of alkyls and alkenyls having 1 to 4 carbon atoms and said group substituted by halogen, and M is an alkali metal such as sodium or potassium, etc.

Dihydrocarbylchlorophosphates used in the present invention as the starting materials, as shown by the Equations B, C and C', consist of alkyl, alkenyl and aryl groups having 1 to 8 carbons and these groups substituted by halogen and, for example, they are di-methylchlorophosphate, di-ethychlorophosphate, di-isopropylchlorophosphate, di-n-butlychlorophosphate, di-iso-butylchlorophosphate, di-hexylchlorophosphate, bis-2-chloroethylphosphate, bis(2,3-dichloropropyl)chlorophosphate, di-octylchlorophosphate, di-allychlorophosphate, di-methallylchlorophosphate and di-phenylchlorophosphate, etc. Alcohols used in the present invention include methanol, ethanol, n-propyl alcohol, isopropyl alcohol, allyl alcohol, methallyl accohol, n-butanol and isobutanols having 1 to 4 carbons. There is the added advantage that tertiary phosphates wherein R and R' are different can similarly be obtained in high yields as shown by Equation D.

As hydrogen chloride-removing compounds, caustic alkalis, such as caustic soda and caustic potash, etc. are used. When the reaction of Equation D took place without using a hydrogen chloride-removing compound, the hydrogen chloride produced will cause dihydrocarbyl phosphates to be produced as by-products as in the case of Equation A, which will simultaneously cause a side-reaction as represented by Equation E given below with the starting materials of dihydrocarbylchlorophosphates, with the result that the yields of tri-substituted hydrocarbyl phosphates are lowered.

$$(RO)_2P(O)OH + (RO)_2P(O)Cl \rightarrow (RO)P(O)OP(O)(OR)_2 \quad (E)$$

wherein R has the same meaning as defined previously. When in this reaction organic amines and ammonia are used as hydrogen chloride-removing compound, the desired principal reaction represented by Equation D does not proceed smoothly since dihydrocarbylchlorophosphates react directly with the organic amines and ammonia. For instance, when ammonia and primary amine are used, they react with dihydrocarbylchlorophosphates as shown by Equation F given below, to give dihydrocarbylphosphoamides.

$$(RO)_2P(O)Cl + R''NH_2 \rightarrow (RO)_2P(O)NHR'' + HCl \quad (F)$$

wherein R has the same meaning as defined previously and R'' stands for hydrogen, an alkyl group or phenyl group.

Secondary and tertiary amines react with dihydrocarbylchlorophosphates to form addition products, assumed to be of the quaternary ammonium-type, as shown by Equation G given below. It is believed that the addition products react with alcohols to form tri-substituted hydrocarbyl phosphates in a manner shown by Equation H below, but the reaction of Equation H proceeds very slowly and it is too difficult to obtain the objective product at high yields.

$$(RO)_2P(O)Cl + R'''_3N \rightarrow [(RO)_2P(O)N^+R'''_3]Cl^- \quad (G)$$

$$[(RO)_2P(O)N^+R'''_3]Cl^- + R'OH \rightarrow (RO)_2P(O)(OR') + R'''_3NHCl \quad (H)$$

wherein R and R' have the same meaning as defined previously and R''' stands for hydrogen or an alkyl group, etc.

When sodium carbonate is used, the hydrogen chloride formed tends to always coexist in the reaction mixture in the reaction of Equation D, as sodium carbonate is slightly-soluble in the reaction mixture, and as a result, a side-reaction is caused by the hydrogen chloride and a yield of about 60% can only be obtained.

However, in the process of this invention wherein caustic alkalis, such as caustic soda and caustic potash, etc., are dissolved or suspended in alcohols, the caustic alkalis which are very soluble in alcohols, are dissolved successively as the reaction proceeds, even when they are suspended in alcohols, so that the hydrogen chloride simultaneously formed in the reaction of Equation D can be neutralized quickly. Namely, tri-substituted hydrocarbyl phosphates can be produced industrially easily only by practicing the process of this invention.

In reacting dihydrocarbylchlorophosphates with alcohols according to the process of this invention, alcohols, as shown in Table 1, are preferably used in an amount of 1.5 equivalents or more per equivalent of dimethylchlorophosphate even in the case, for example, of trimethyl phosphate, and by using alcohols in an amount of 2.0 equivalents or more, the objective products can be obtained at particularly high yields. The same is true when the alcohol used has a large number of carbons.

TABLE 1

|  | 1 | 2 | 3 | 4 |
|---|---|---|---|---|
| MeOH/(MeO)$_2$P(O)Cl (mole ratio) | 10/1 | 5/1 | 3/1 | 2/1 |
| Final MeOH/H$_2$O (mole ratio) | 9/1 | 4/1 | 2/1 | 1/1 |
| Yield (percent) | 90.5 | 91.5 | 91.5 | 80.5 |

Reaction temperature = 0 to 5° C.

As shown in Equation D, an equivalent amount of water is formed as a result of neutralizing the hydrogen chloride produced with a caustic alkali. This principal reaction is considered as a nucleophilic reaction between alcohols and dihydrocarbylphosphoryl ion as represented by Equation I given below and therefore the water formed during the reaction does not give any substantial effect on the principal reaction in the condition of Table 1.

$$(RO)_2P^+(O) + R'OH \rightarrow (RO)_2P(O)(OR') + H^+ \quad (I)$$

In the case, for example, of trimethyl phosphate, the objective products can be obtained at high yields as shown in Table 2, by using alcohols in such an amount that the mol ratio of alcohol to water in the reaction mixture upon completion of the reaction be 1/1 or higher. However, when the final mol ratio of alcohol to water becomes 0.5/1, the yield is reduced somewhat. The same is true when the number of carbons of R' becomes large.

TABLE 2

|  | 1 | 2 | 3 | 4 |
|---|---|---|---|---|
| MeOH/H$_2$O (mol ratio) before reaction | 10/1 | 5/1 | 5/4 | 4/6 |
| MeOH/H$_2$O (mol ratio) after reaction | 9/1 | 3.5/1 | 1/1 | 1/2 |
| Yield (percent) | 90.5 | 90.0 | 85.0 | 73.8 |

Reaction conditions:
  Mol ratio of MeOH/(MeO)$_2$P(O)Cl = 10/1
  Reaction temperature = 0 to 5° C.

There is the tendency that alcohols do not dissolve caustic alkalis therein as they become higher. If this occurs, a small amount of water is added to the alcohol so as to make the mol ratio, after completion of the reaction, of alcohol to water 0.5/1 or higher, whereby the caustic alkalis can be dissolved with ease or forms a suspension equivalent to the solution and the objective principal reaction can be carried out smoothly. Since caustic alkalis are used in the reaction, the reaction liquid is maintained alkaline throughout the reaction and the yield is not substantially adversely affected if the reaction liquid upon completion of the reaction is more alkaline than the Methyl Orange neutral, and more preferably is more alkaline than the Bromothymol Blue neutral (pH 6.2 to 7.6). For this purpose, it is preferable to use caustic alkalis in an amount about 2 to 5% in excess to the equivalent.

The reaction is most preferably carried out at a temperature not higher than 25° C. and the yield is reduced somewhat as the temperature elevates. This is probably because of a side reaction which tends to occur between the water formed during the reaction and dihydrocarbylchlorophosphates as represented by Equation J given below, and the resultant dihydrocarbylphosphates cause a side reaction with the starting material dihydrocarbylphosphates as shown by Equation E.

$$(RO)_2P(O)Cl + H_2O \rightarrow (RO)_2P(O)OH + HCl \quad (J)$$

As a method of preparing tri-substituted hydrocarbyl phosphates, there has been reported a process (U.S. Pat. No. 2,426,691) wherein the reaction is carried out using sodium alcoholate and the sodium chloride precipitated after the reaction is filtered. In this process, the reaction takes place so intensely that the sodium chloride precipitates in an extremely small particle size and therefore cannot be removed by filtering. According to the process of the present invention wherein the reaction proceeds gently, the sodium chloride precipitates in a large crystal so that it can be filtered away with no substantial difficulty. Alternatively, tri-substituted hydrocarbyl phosphates may be separated by extracting them with hydrocarbon halogenides, such as chloroform, after dissolving the sodium chloride and potassium chloride by the addition of water. After separating the sodium chloride by filtering or extraction, the solvent is recovered under normal pressure and thereafter the remaining is distilled under reduced pressure, whereby tri-substituted hydrocarbyl phosphates can be obtained at high yield.

EXAMPLE 1

Preparation of trimethyl phosphate

By reacting 250.0 g. (1.80 mols) of phosphorus trichloride with 170.0 g. (5.60 mols) of methyl alcohol, using 400 ml. of benzene as solvent and while cooling the reaction mixture with ice, substantially pure dimethylphosphite was obtained. Chlorine was passed through the dimethylphosphite while cooling the latter and a dimethylchlorophosphate solution was obtained. After purging the hydrogen chloride, produced during the reaction, by passing dry air through the solution, the dimethylchlorophosphate solution to be used as the starting material contained 1.97 mols of chlorine ion. (A small amount of hydrogen chloride is containing.) Separately, 90.0 g. (2.25 mols) of caustic soda was dissolved in 180.0 g. (5.62 mols) of methanol, in which the aforesaid dimethylchlorophosphate solution was dropped and the reaction was carried out while maintaining the reaction temperature at −5 to 5° C. Upon completion of the reaction, the reaction mixture was further stirred for 20 minutes and then 450 ml. of water was added to dissolve the precipitated sodium chloride. Thereafter, trimethylphosphate was extracted with 800 ml. of chloroform. The solvent phase was removed and concentrated under normal pressure. By distilling the residue under reduced pressure, 235.8 g. of trimethylphosphate having a boiling point of 83 to 85° C./20 mm. Hg was obtained. The yield with respect to the phosphorus trichloride was 92.5%.

EXAMPLE 2

Preparation of triethyl phosphate

A mixture of 63.0 g. (1.57 mols) of caustic soda, 207.0 g. (4.50 mols) of ethyl alcohol and 27.0 g. (1.50 mols) of water, was reacted with a mixture of 258.8 g. (1.50 mols) of diethylchlorophosphate, having a boiling point of 93 to 95° C./8 mm. Hg and obtained in the same manner as in Example 1, and 300 ml. of chloroform, by dropping the latter while maintaining the reaction temperature at 0 to 5° C. Upon completion of the reaction, the reaction mixture was stirred at normal temperature (15° C.) for 15 minutes. The precipitated sodium chloride was filtered and washed with 200 ml. of chloroform. The filtrate and the washing were joined and concentrated under normal pressure. By distilling the residue under reduced pressure, 258.8 g. of triethyl phosphate was obtained whose boiling point was 104 to 106° C./20 mm. Hg. The yield was 94.8%.

EXAMPLE 3

Preparation of tri-isobutyl-phosphate 137.5 g. (1.0 mol) of phosphorus trichloride and 225.0 g. (3.04 mols) of isobutyl alcohol were synthetized in the same manner as in Example 1, and the resultant di-isobutylchlorophosphate solution contained 1.05 mols of chlorine ion. Separately, 61.6 g. (1.10 mols) of caustic potash was suspended in 370.0 g. (5.0 mols) of isobutyl alcohol, in which the aforesaid di-isobutylchlorophosphate solution was dropped and the reaction was carried out while maintaining the reaction temperature at 5 to 10° C. Upon completion of the reaction, the solvent phase was concentrated and the residue was distilled under reduced pressure as in Example 1, whereby 226.0 g. of triisobutyl phosphate having a boiling point of 135 to 136° C./10 mm. Hg was obtained. The yield was 85.0%.

EXAMPLE 4

Preparation of diisopropylmethylphosphate 300.5 g. (5.0 mols) of isopropyl alcohol was reacted with 227.0 g. (1.65 mols) of phosphorus trichloride, using 350 ml. of carbon tetrachloride as solvent, and a diisopropylchlorophosphate solution was obtained in the same manner as in Example 1, which solution contained 1.85 mols of chlorine ion. Separately, 80.0 g. (2.0 mols) of caustic soda was dissolved in 185.0 g. (5.78 mols) of methanol, in which the aforesaid crude diisopropylchlorophosphate solution was dropped and the reaction was carried out while maintaining the reaction temperature at 10 to 15° C. Upon completion of the reaction, the reaction mixture was processed in the same manner as in Example 2 and then the filtrate and the washing were concentrated under normal pressure. By distilling the residue, 296.0 g. of diisopropyl-methylphosphate having a boiling point of 98 to 100° C./16 mm. Hg was obtained. The yield with respect to the phosphorus trichloride was 91.4%.

EXAMPLE 5

Preparation of di-n-octylmethylphosphate

By reacting 200.0 g. (1.53 mols) of n-octyl alcohol with 70.0 g. (0.509 mol) of phosphorus trichloride in the same manner as in Example 1, di-n-octylchlorophosphate was obtained. After adding chloroform to this solution, the total solution contained 0.52 mol of chlorine ion. Separately, 21.0 g. (0.525 mol) of caustic soda was dissolved in 51.2 g. (1.60 mols) of methanol to form a suspension, in which the crude dioctylchlorophosphate solution was dropped and the reaction was carried out while maintaining the reaction temperature at 5 to 10° C. Upon completion of the reaction, the reaction mixture was stirred for 25 minutes at normal temperature and then 200 ml. of chloroform was further added. The liquid phase was separated in the same manner as in Example 1. The chloroform was concentrated under normal pressure and the residue was distilled under reduced pressure, whereby 154.1 g. of dioctylmethylphosphate having a boiling point of 162 to 163° C./1 mm. Hg was obtained. The yield with respect to the phosphorus trichloride was 90.0%.

EXAMPLE 6

Preparation of dimethyl-methallyl phosphate 216.8 g. (1.50 mols) of dimethylchlorophosphate having a boiling point of 78 to 79° C./17 mm. Hg and obtained in the same manner as in Example 1, was dropped into a mixture of 62.0 g. (1.55 mols) of caustic soda and 324.0 g. (4.50 mols) of methallyl alcohol, while maintaining the reaction temperature at 0 to 5° C. Upon completion of the reaction, the reaction mixture was stirred for 15 minutes at normal temperature and then the precipitated sodium chloride was removed by filtering in the same manner as in Example 2. The filtrate and the washing were joined and concentrated under normal pressure. By distilling the residue under reduced pressure, 241.4 g. of dimethyl-methallyl phosphate having a boiling point of 104 to 106° C./16 mm. Hg was obtained. The yield was 89.4%.

EXAMPLE 7

Preparation of diallyl-methylphosphate 200.0 g. (1.30 mols) of phosphorus oxychloride and 150.0 g. (2.50 mols) of allyl alcohol were reacted with each other in about 600 ml. of chloroform while maintaining the mixture at 30 to 35° C., whereby a substantially pure diallylchlorophosphate solution was obtained. (The amount of chlorine ion contained in this mixture was 1.32 mols.) Separately, 60.0 g. (1.40 mols) of caustic soda was dissolved in 128.0 g. (4.0 mols) of methanol, into which the aforesaid diallylchlorophosphate solution was dropped while maintaining the reaction temperature at 0 to 5° C., whereupon the reaction took place while generating heat. Upon completion of the dropping, the reaction mixture was stirred for 15 minutes and then about 350 ml. of water was added to dissolve the sodium chloride formed. Further, about 200 ml. of chloroform was added. Thereafter, the process was operated in the same manner as in Example 1 and 199.7 g. of diallyl-methylphosphate was obtained whose boiling point was 79 to 81° C./4 mm. Hg. The yield was 80%.

EXAMPLE 8

Preparation of diphenyl-methallylphosphate 30.8 g. (0.55 mol) of caustic potash was dissolved and suspended in 150.0 g. (2.08 mols) of methallyl alcohol, into which 87.8 g. (0.50 mol) of diphenylchlorophosphate, obtained from phosphorus oxychloride and phenol, was dropped. The reaction temperature was 15 to 20° C. Upon completion of dropping, the reaction mixture was stirred for 30 minutes and then treated with about 400 ml. of chloroform in the same manner as in Example 1. After removing the chloroform, a highly viscous objective diphenyl-methallylphosphate was obtained in an amount of 88.2 g. ($n_D^{25}$ 1.5243). The yield was 83.5% from phosphorus oxychloride.

EXAMPLE 9

Preparation of bis-2-chloroethylallylphosphate 103.5 g. (0.5 mol) of bis-2-chloroethylphosphite obtained from ethylene chlorohydrin and phosphorus trichloride, was dissolved in about 300 ml. of chloroform and chlorinated in the same manner as in Example 1. The resultant solution contained 0.51 mol of chlorine ion. In accordance with the chlorine ion in the solution, 22.0 g. (0.55 mol) of caustic soda was dissolved and suspended in 116.0 g. (2.0 mols) of allyl alcohol separately, into which the aforesaid solution of bis-2-chloroethylchlorophosphate in chloroform was dropped and the reaction was carried out at a temperature of 10 to 15° C. Thereafter, the reaction mixture was processed in the same manner as in Example 1 and upon distillation under reduced pressure, 116 g. of bis-2-chloroethyl-allylphosphate having a boiling point of 144 to 146° C./5 mm. Hg. was obtained. The yield was 87.6%.

What is claimed is:

1. A process for the preparation of tri-substituted hydrocarbyl phosphates of the formula $$(RO)_2P(O)(OR')$$

wherein R is selected from the group consisting of alkyls, alkenyls and aryls having 1 to 8 carbon atoms and said groups substituted by chlorine, and R' is selected from the group consisting of alkyls and alkenyls having 1 to 4 carbon atoms and said groups substituted by chlorine, said process comprising reacting a di-hydrocarbylchlorophosphate of the formula $(RO)_2P(O)Cl$ wherein R is as defined above with an alcohol of the formula R'OH wherein R' is as defined above, while stirring in the presence of a caustic alkali, wherein said alcohols are used in an amount such that the mol ratio, upon completion of the reaction of alcohol to water is at least 0.5.

2. A process as claimed in claim 1, wherein the reaction is carried out at a temperature not higher than 25° C.

References Cited

UNITED STATES PATENTS

| | | | |
|---|---|---|---|
| 2,922,811 | 1/1960 | Britton et al. | 260—973 |
| 3,022,330 | 2/1962 | Lanham | 260—973X |

CHARLES B. PARKER, Primary Examiner

A. H. SUTTO, Assistant Examiner

U.S. Cl. X.R.

260—956, 963